Sept. 7, 1965  J. W. RANDALL  3,204,846
GRIPPER CONTROL FOR WIRE STITCHER HEAD
Filed Feb. 13, 1964  3 Sheets-Sheet 1

INVENTOR:
JOHN W. RANDALL
BY
Harrington A. Lackey
ATTORNEY

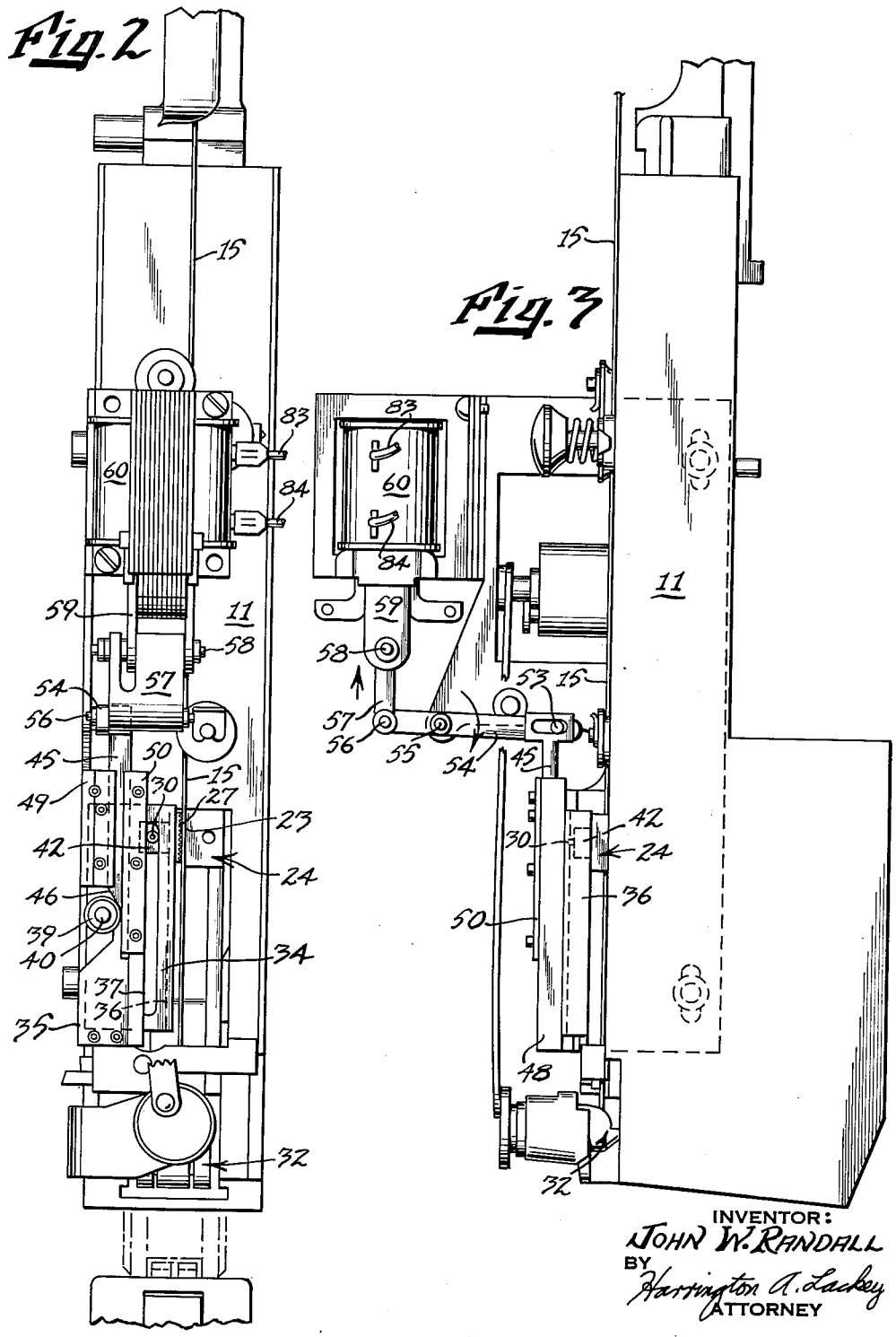

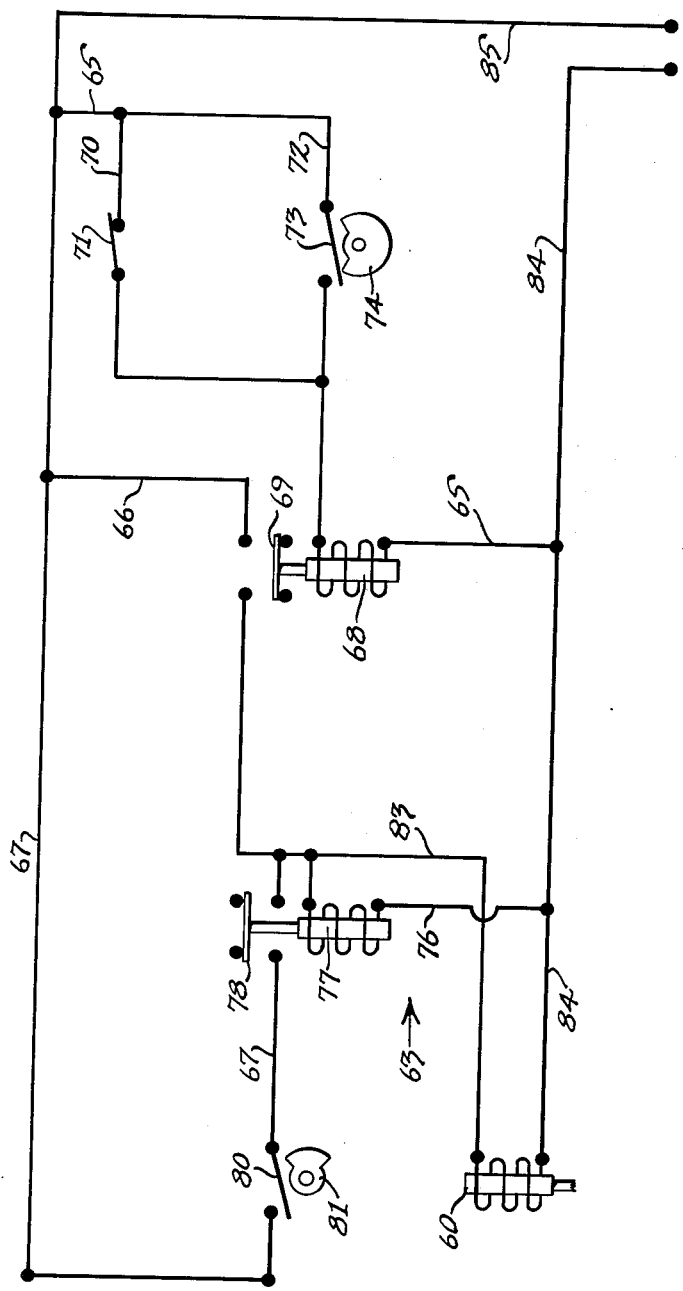

United States Patent Office 3,204,846
Patented Sept. 7, 1965

3,204,846
GRIPPER CONTROL FOR WIRE STITCHER HEAD
John W. Randall, Nashville, Tenn., assignor to Baird-Ward Printing Company, Inc., Nashville, Tenn., a corporation of Tennessee
Filed Feb. 13, 1964, Ser. No. 344,705
13 Claims. (Cl. 227—5)

This invention relates to a wire stitcher head, and more particularly, to a gripper control for a wire stitcher head.

In a conventional wire stitcher head, such as a Boston wire stitcher head, for such uses as book stitching, calendar stitching or box stitching, wire is fed to a staple forming and driving mechanism by a pair of grippers, or jaws mounted for reciprocable movement in the stitcher head. These jaws grip the wire and carry it in the feeding direction, then release the wire and return in the reverse direction to their original position for gripping the wire again. Thus, the wire is fed intermittently by the jaws to a staple formng and driving mechanism in the stitcher head. All these parts are designed to operate automatically.

In order to stop the stitcher head when an article, such as a book, to be stitched is missing from its stitching station, an electrical detector mechanism has been employed in conventional stitching machines for energizing controls to stop the entire operation of the stitcher head. Since the parts for driving the stitcher head, including the parts for reciprocating the jaws, are massive, considerable energy is expended in overcoming the inertia of the parts to stop and start the stitching machine every time an article to be stitched is missing.

It is therefore an object of this invention to provide controls for stopping the feeding of the wire to the staple forming and driving mechanism of the stitcher head without stopping the reciprocable movement of the grippers or their associated parts.

Another object of this invention is to provide electromagnetic controls for maintaining the movable grippers or jaws in a wire stitcher head in a non-gripping position, while both the movable and fixed jaws of the stitcher head continue to reciprocate, and while an article to be stitched is missing from the article conveyor or the article is incomplete.

A further object of this invention is to provide electromagnetic gripper controls including a laterally movable gripper support, which will move one of the grippers in a wire stitcher head laterally, but includes guide means permitting the free longitudinal reciprocable movement of the gripper.

Further objects and advantages of the invention will be apparent from the following description, taken in conjunction with the drawings, wherein:

FIG. 2 is an enlarged side elevation of the invention mounted on the stitcher head disclosed in FIG. 1;

FIG. 3 is a front elevation of the device disclosed in FIG. 2;

FIG. 8 is a schematic diagram of the electrical control circuit.

Figure 1:
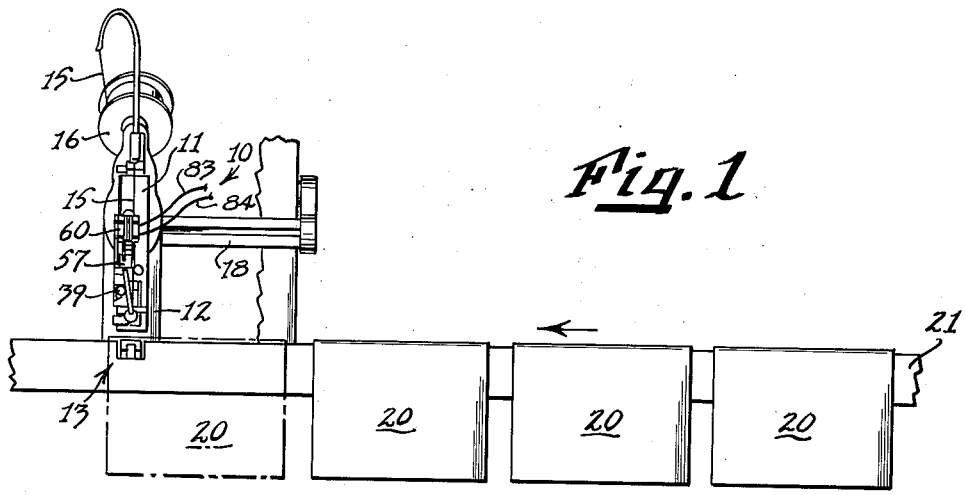
FIG. 1 is a side elevation of the invention mounted on a wire stitcher head employed in a saddle stitched book making machine.

Referring now to the drawings in more detail, FIG. 1 discloses a portion of a book stitching machine 10, including a wire stitcher head, such as the Boston wire stitcher head 11, mounted on a stationary support 12 at a stitching station 13. Wire 15 is supplied to the stitcher head 11 from a spool 16 also fixed to the support 12. The stitcher head is driven by any convenient power means, such as the reciprocable drive bar 18, driven by a motor, not shown. Although only one stitcher head 11 is disclosed, it will be understood that a plurality of stitcher heads are customarily drivingly mounted on the drive bar 18 to simultaneously stitch a plurality of staples into one or more books or magazines 20. The books 20 straddle a saddle-shaped conveyor 21 which is moved in the direction of the arrow in FIG. 1, by means, not disclosed, to feed each successive book 20 to stitching station 13 for operation thereupon by the stitcher head 11.

Figure 7:
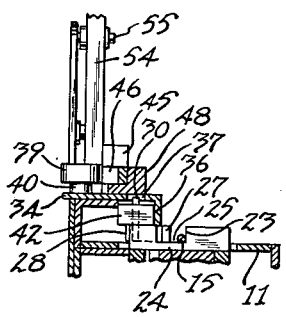
FIG. 7 is a section taken along the line 7—7 of FIG. 4.

A conventional stitcher head 11 includes a stationary gripper or jaw 23, which is an integral part of a vertically reciprocable member 24 having a U-shaped cross section, as best disclosed in FIG. 7. A vertical slot 25 is formed in the U-shaped block 24 to provide a guide passage for the wire 15. A movable gripper, or jaw, 27, is T-shaped having a serrated surface for engaging and holding one side of the wire 15 when the jaw 27 has been closed to secure the wire 15 between the jaws 23 and 27. The stem 28 of jaw 27 is slidably received in a corresponding slot 29 in the block 24 to permit the jaw 27 to move laterally toward and away from stationary jaw 23 to engage and release the wire 15. An elongated spring finger 30 extends outwardly from the stitcher head 11 and through a mating opening in stem 28 in such a manner as to normally bias the movable jaw 27 into closed engagement with wire 15 against stationary jaw 23, as best disclosed in FIG. 2. Thus, when the block 24 is reciprocating from its upper solid line position in FIG. 2 downward, the jaws 27 and 23 will grip and carry with them the wire 15, downwardly toward the staple forming and driving mechanism 32 of conventional construction.

However, when the reciprocable block 24 reaches its lowermost position, there are means operative within the stitcher head 11, not shown, which force the movable jaw 27 to open or move laterally away from stationary jaw 23 against the biasing action of spring 30, so that the wire 15 is released while the block 24 reciprocates upwardly during its return motion. When the block 24 again reaches its uppermost position, the movable jaw 27 is automatically dis-engaged from its operative opening means so that the spring 30 forces it into closed gripped engagement with the wire 15 against the stationary jaw 23, and the wire feeding cycle is repeated. Thus, for each reciprocable cycle of the jaws 23 and 27, a staple is formed and driven into the book or magazine 20 at the stitching station 13. The parts in operation thus far described are old in the art of wire stitcher heads.

The novel gripper control mechanism for maintaining the jaws 23 and 27 continuously open when one or more books 20 is absent from the conveyor 21, includes a cam plate 34 mounted upon stitcher head 11 to reciprocate laterally thereof in suitable guideways, not shown, behind retainer plate 35. The cam plate 34 is provided with an inwardly directed vertical flange, or track 36 and an elongated vertical slot 37 spaced adajcent the flange 36. A cam surface, such as the freely rotatable roller 39 on stub shaft 40, is fixed to the cam plate 34 adjacent the opposite edge of the plate 34 from the flange 36.

The slide bearing or block 42 is supported by the spring finger 30 to bear against the inside surface of track or flange 36. The free end of the spring finger 30 may extend outwardly to be received for vertical movement in the slot 37. Thus, it will be seen that the spring finger 30 may freely ride up and down in the slot 37 while the bearing 42 may freely slide up and down the track 36 regardless of the lateral position of the cam plate 34.

Figures 4, 5, 6:
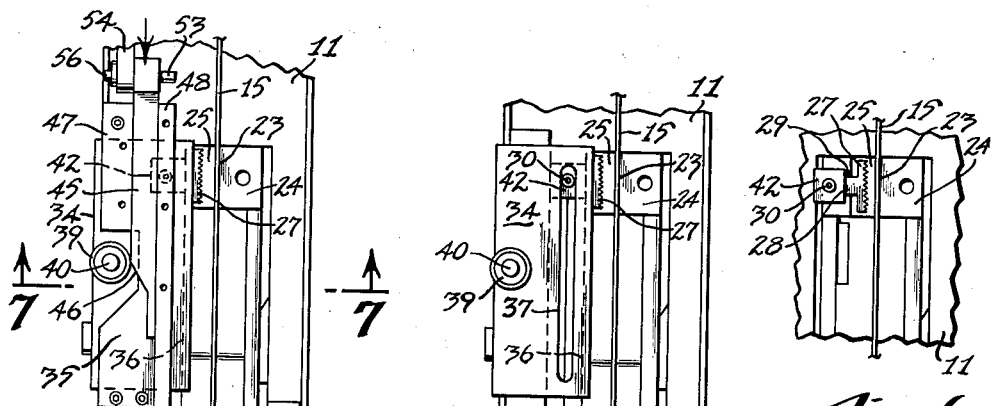
FIG. 4 is a fragmentary side elevation of a portion of the invention disclosed in FIG. 2 with the cam bar cover plates removed.
FIG. 5 is a view similar to FIG. 4 with the cam bar and the guide bars removed.
FIG. 6 is a view similar to FIG. 5 with the cam plate removed.

As best disclosed in FIGS. 2 and 4, a cam bar 45 having an angular cam surface 46 is guided for free vertical reciprocation between bars 47 and 48 fixed to the stitcher head 11. The cam bar 45 may be further constrained by the cover plates 49 and 50 fixed to the guide bars 47 and 48, respectively, as disclosed in FIG. 2.

The upper end of the cam bar 45 is pivotally connected by a pin 53 to the inner end of a link bar 54, the middle portion of which is pivotally connected by a pin 55 to a stationary part of the stitcher head 11. The outer end of the link bar 54 is pivotally connected by a pin 56 to another link member 57, which in turn, is pivotally connected by a pin 58 to the armature 59 of the solenoid 60, fixed upon the stitcher head 11.

The solenoid 60 is controlled by a detector circuit 63 as best disclosed in FIG. 8. The detector circuit 63 includes in parallel, a first relay circuit 65, a first solenoid switch circuit 66 and a second solenoid switch circuit 67. The first relay circuit 65 includes a first coil or relay 68 for controlling switch 69 in the first solenoid circuit 66. The first relay circuit 65 also comprises a switch circuit 70 including switch finger 71 normally biased open by means not shown, but located in the path of the moving books 20, so that a book passing over, beneath or against the switch finger 71 will depress the switch to close the switch circuit 70. A second switch circuit 72 is connected in parallel with the switch circuit 70, and includes a cam switch 73 adapted to be closed and opened by the cam 74 which is continuously rotated at a constant velocity by means, not shown, connected to the other moving and driving parts of the book stitching machine 10. The shape and angular position of the cam 74 are such that the cam switch 73 is normally open when the book switch 71 is closed. The first relay circuit 65 is designed so that as long as either or both switches 71 and 73 are closed, relay circuit 65 will be closed to energize the relay coil 68 to maintain the switch 69 in the normally open solid line position of FIG. 8. When both switches 71 and 73 are open the relay 68 is de-energized to close switch 69 and consequently close the first solenoid circuit 66.

Although both solenoid circuits 66 and 67 are connected in parallel, they are also connected in series with the second relay circuit 76 including the second relay or coil 77, which controls relay switch 78 in the second solenoid circuit 67. A second cam switch 80 is connected in the second solenoid circuit 67 and is also adapted to be opened and closed by the rotary cam 81.

The gripper control solenoid 60 is also connected in series with each solenoid circuit 66 and 67, but is connected across the relay circuit 76 by means of leads 83 and 84. Power is supplied to the circuit 63 through input lead 85, and lead 84 provides the common ground or return line.

The operation of the invention, including circuit 63 is as follows:

When a machine, such as the book stitching machine 10, is operating normally, the drive bar 18 is reciprocating vertically to reciprocate the block 24 so that the jaws 23 and 27 close on the downward stroke and open on the upward stroke to intermittently feed the wire 15 to the staple forming and driving mechanism 32. The books 20 are fed at a continuous rate by the conveyor 21 to the stitching station 31 to be operated upon by the stitcher head 11. Electrical power is supplied to the circuit 63 through leads 85 and 84, and the switch finger 71 is depressed every time it engages a book to close circuit 70. However, when the switch finger 71 is open in the spaces between the books 20, then the cam 74 will close switch 73 during these brief periods, so that relay circuit 65 is continuously energized to open switch 69 as long as the books 20 are continuously fed and normally spaced. Consequently, solenoid circuit 66 remains open to de-energize relay 77, open switch 78 and, consequently, open solenoid circuit 67. Thus, solenoid 60 remains de-energized to maintain the cam bar 45 in the raised, solid line position of FIG. 2, and permit cam plate 35 to be over-ridden by the normal gripper actuating mechanism of stitcher head 11.

However, when one or more books 20 is missing from the conveyor 21, then the switch finger 71 will remain open longer than the switch closing cycle of cam 74, so that cam switch 73 will also open while switch 71 is open, thereby de-energizing the relay circuit 65 and coil 68 to close switch 69 and solenoid circuit 66. The current flowing through circuit 66 will not only energize solenoid 60, but will also energize the relay circuit 76 and coil 77 to close switch 78. The angular position of cam 81 is related to the angular position of cam 74, so that switch 80 is also closed when switch 78 is initially closed to also close the solenoid circuit 67. Thus, when the cam 74 rotates again to its switch closing position to thereby energize relay 68 and open switch 69, the solenoid circuit 67 will remain closed by self-energizing itself through the relay coil 77 and continue energizing the solenoid 60 for one reciprocating gripper cycle, as determined by the shape of cam 81. When cam 81 rotates to open the cam switch 80, the solenoid 60 is de-energized, and the cycle is completed. Of course, if a second book is missing, the switch 71 will again remain open to repeat the solenoid energizing cycle.

When solenoid 60 is energized by circuit 63, armature 59 is retracted to thrust the cam bar 45 downward to the positon disclosed in FIG. 4, whereby the cam surface 46 engages and forces outward the cam roller 39. When the cam roller 39 is forced outwardly, or to the left as viewed in FIGS. 2, 4 and 5, it will carry with it cam plate 34, flange 36 and slide block 42 to open the gripper 27, without interfering with its vertical movement with the block 24. As long as the solenoid 60 remains energized, no wire will be fed to the staple forming and driving mechanism 32. When the normal feeding of the books 20 resumes, the solenoid 60 will be de-energized, as previously described. The armature 59 will then be permitted to drop by gravity to its original inoperative position thus raising the cam bar 45 to dis-engage roller 30 so that grippers 23 and 27 will again pursue their normal gripping and feeding courses controlled by the stitcher head 11.

It will thus be seen that a novel and improved control mechanism has been provided to maintain the movable gripper or jaw of a conventional wire stitcher head in wire releasing or non-feeding position, when it is desired that the head not stitch, without stopping the rest of the operation of the stitcher head. This device is not only simple in its construction and operation, but may be readily mounted upon a conventional wire stitcher head, such as the Boston wire stitcher head. Furthermore, the gripper control positively maintains the movable gripper jaw away from the fixed gripper jaw during the enitre time that the control is energized, without in any way interfering with the free vertical reciprocation of the movable jaw. This gripper control device reduces to a minimum the number and mass of elements in the stitcher head and its driving mechanism which must be started and stopped in order to stitch or not stitch.

It will be apparent to those skilled in the art that various changes may be made in the invention, without departing from the spirit and scope thereof, and therefore the invention is not limited by that which is shown in the drawings and described in the specification, but only as indicated in the appended claims.

What is claimed is:

1. In an automatic wire stitcher head having a fixed wire gripper jaw and an opposed laterally movable wire gripper jaw mounted on said head for longitudinal reciprocable movement, said head including means for closing said movable jaw against said stationary jaw while said jaws are moving in one longitudinal direction for feeding wire, and means for opening said jaws to release said wire while said jaws are moving in the reverse longitudinal direction; means for maintaining said jaws open comprising:
   (a) guide means mounted on said head for lateral reciprocable movement.
   (b) means for supporting said movable jaw in said guide means for free longitudinal reciprocable movement; and
   (c) means for laterally moving said guide means to carry said movable jaw away from said stationary jaw to release said wire without interfering with the longitudinal movements of said jaws.

2. The invention according to claim 1 in which said guide means comprises a longitudinal track, said movable jaw having a bearing member supported on said track for reciprocable movement thereon.

3. The invention according to claim 1 in which said means for laterally moving said guide means comprises a cam surface on said guide means, a reciprocable cam, and means for moving said cam in one reciprocable direction to engage said cam surface to thrust said guide means away from said fixed jaw.

4. The invention according to claim 3 in which said cam surface comprises a roller bearing.

5. The invention according to claim 3 in which said cam comprises an elongated cam member, means on said head for for guiding said cam member for longitudinal movement, said means for moving said cam comprising a solenoid.

6. In an automatic wire stitcher head having a fixed wire gripper jaw and an opposed laterally movable wire gripper jaw mounted on said head for longitudinal reciprocable movement, said head including means for closing said movable jaw against said stationary jaw while said jaws are moving in one longitudinal direction for feeding wire, and means for opening said jaws to release said wire while said jaws are moving in the reverse longitudinal direction; means for maintaining said jaws open comprising:
   (a) a plate mounted on said head for lateral reciprocable movement,
   (b) a longitudinal track formed on said plate,
   (c) a bearing on said movable jaw supported on said track for longitudinal movement thereon,
   (d) a cam surface fixed to said plate,
   (e) a cam bar,
   (f) guide means on said head for receiving said cam bar for reciprocal movement toward and away from engagement with said cam surface,
   (g) electromagnetic means for reciprocably moving said cam bar in said guide means to engage said cam bar with said cam surface to thrust said plate laterally and carry said movable jaw away from said fixed jaw to release said wire.

7. The invention according to claim 6 in which said cam surface comprises a roller bearing rotatably mounted on a shaft fixed to said plate so that a portion of said roller bearing extends into the longitudinal reciprocable path of said cam bar for engagement by said cam.

8. The invention according to claim 6 in which said electromagnetic means comprises a solenoid having a reciprocable armature mounted on said head, a link arm and means for pivotally supporting said link arm on said head, one end of said link arm being pivotally connected to said cam bar and the other end of said link being pivotally connected to said armature.

9. The invention according to claim 6 further comprising means for feeding books in series toward a stitching station for operation thereupon by said stitching head, means in advance of said stitching station for detecting the presence of said books, and electrical means for connecting said detecting means to said electromagnetic means so that when said detecting means detects the absence of a book, said electromagnetic means will be energize to open said jaws and release said wire, said detecting means de-energizing said electromagnetic means when the presence of a book is detected.

10. In a book stitching machine having a wire stitcher head mounted at a wire stitching station, and means for feeding books in series to said station, said stitcher head having opposed jaws for gripping and feeding wire while moving in one longitudinal direction and for releasing said wire while moving in the opposite longitudinal direction, means for maintaining said jaws open comprising:
   (a) electromagnetic means, including a solenoid, for moving one of said jaws away from said other jaw to release said wire,
   (b) an electrical control circuit for energizing said solenoid,
   (c) relay switch means in said control circuit,
   (d) a relay circuit in said control circuit including a switch finger mounted in the feeding path of said books for engagement by each book to close said relay circuit,
   (e) said relay circuit being adapted to energize said relay switch means to open said control circuit when said relay circuit is closed, and to close said control circuit when said relay circuit is open.

11. The invention according to claim 10 in which said relay circuit includes a cam switch connected in parallel with said switch finger and a cam adapted to close said cam switch for a predetermined period of time while said switch fingers is open in order to maintain a closed relay circuit.

12. The invention according to claim 11 in which said control circuit comprises first and second solenoid circuits in parallel, and said relay switch means comprises a first relay switch in said first solenoid circuit and a second relay switch in said second solenoid circuit, said relay circuit being adapted to control said first relay switch, a second relay circuit in series with each of said first and second solenoid circuits and adapted to control said second relay switch, said solenoid being connected in series with each of said first and second solenoid circuits and in parallel with said second relay circuit.

13. The invention according to claim 12 in which said second solenoid circuit includes a second cam switch, and a second cam adapted to maintain said second solenoid circuit closed for a predetermined time while said second relay switch is closed.

No references cited.

GRANVILLE Y. CUSTER, Jr., *Primary Examiner.*